L. D. OLIVER.
BRICK KILN.
APPLICATION FILED AUG. 29, 1913.
1,144,334. Patented June 22, 1915.

Inventor
L. Dave Oliver

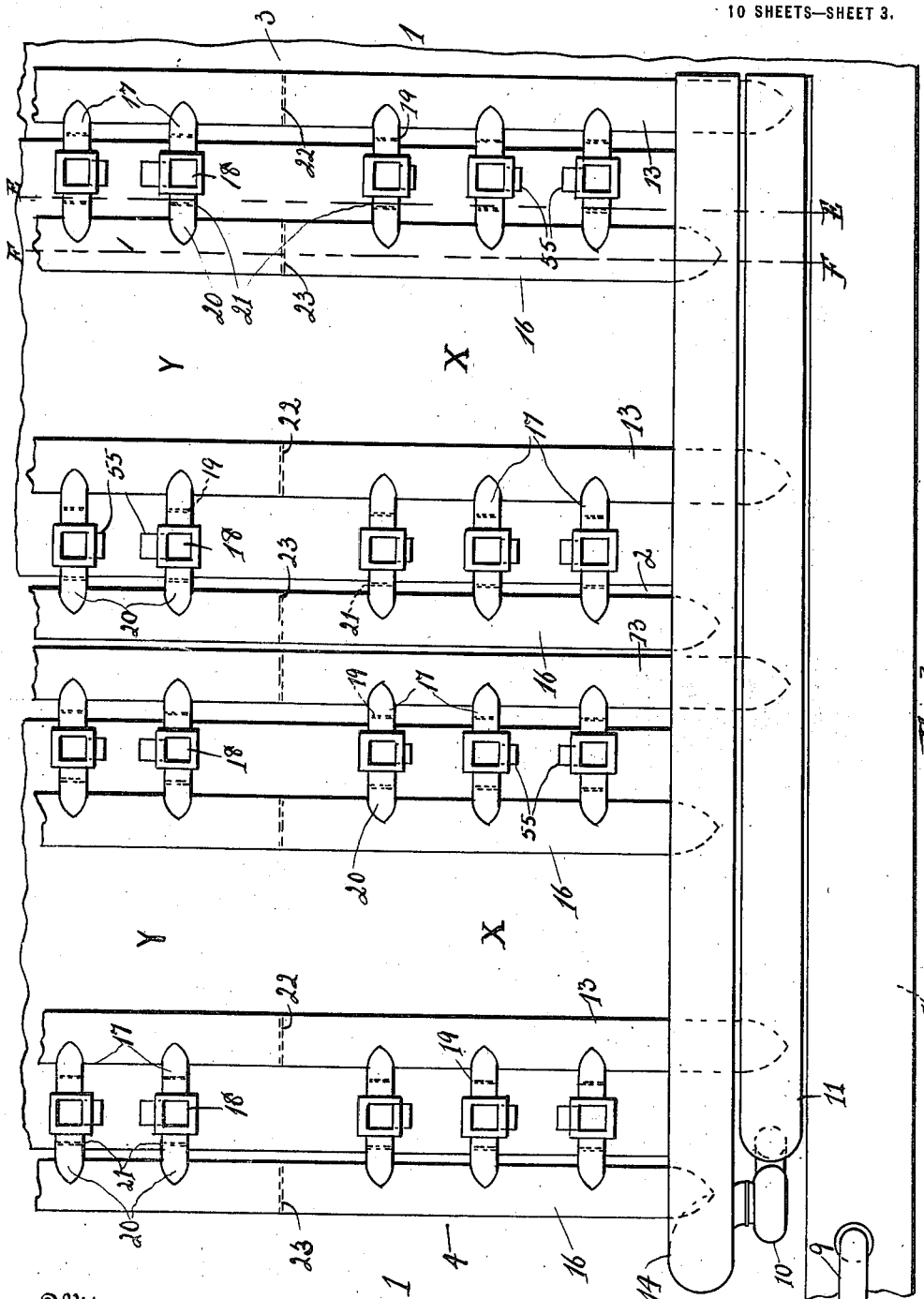

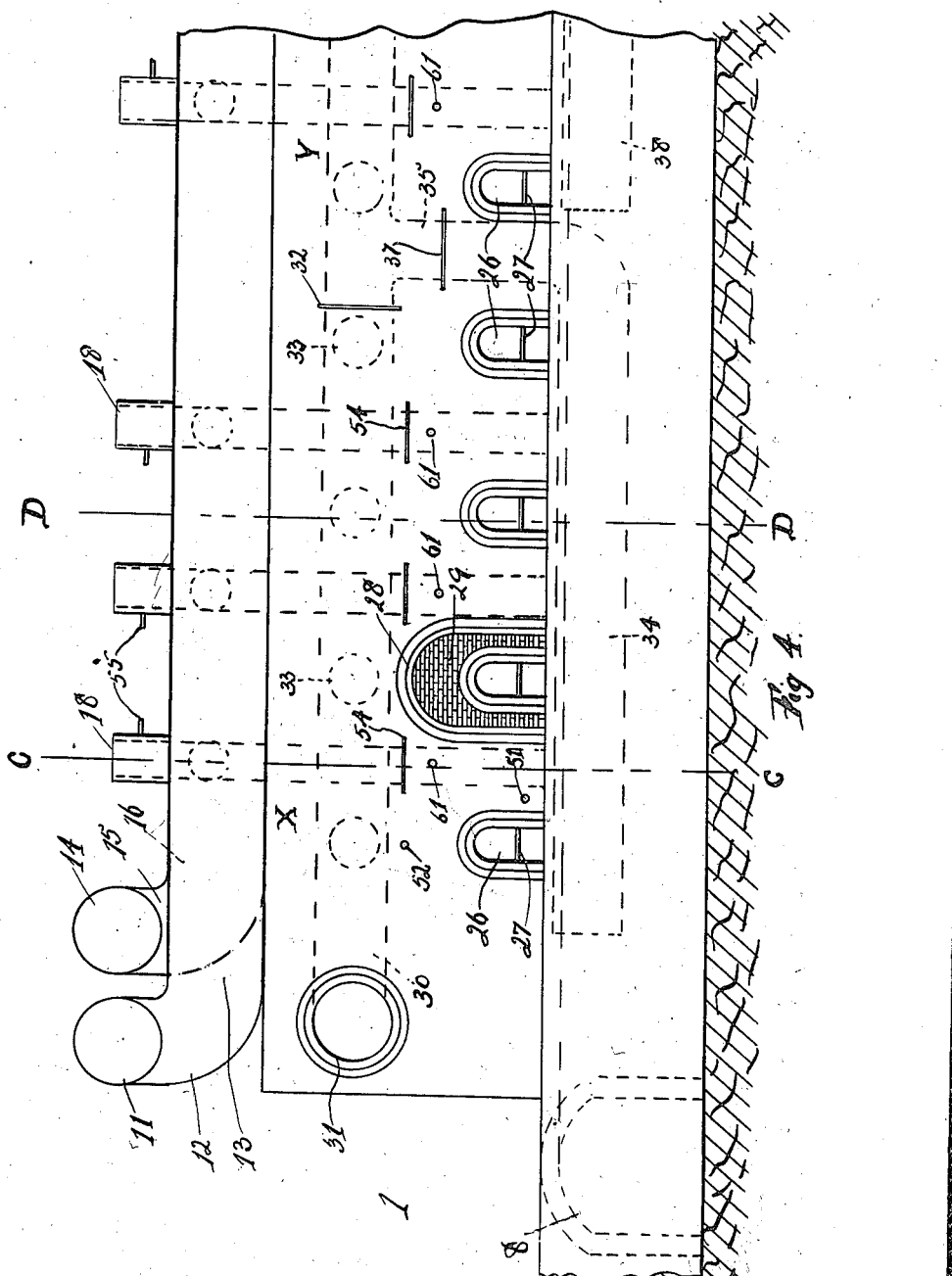

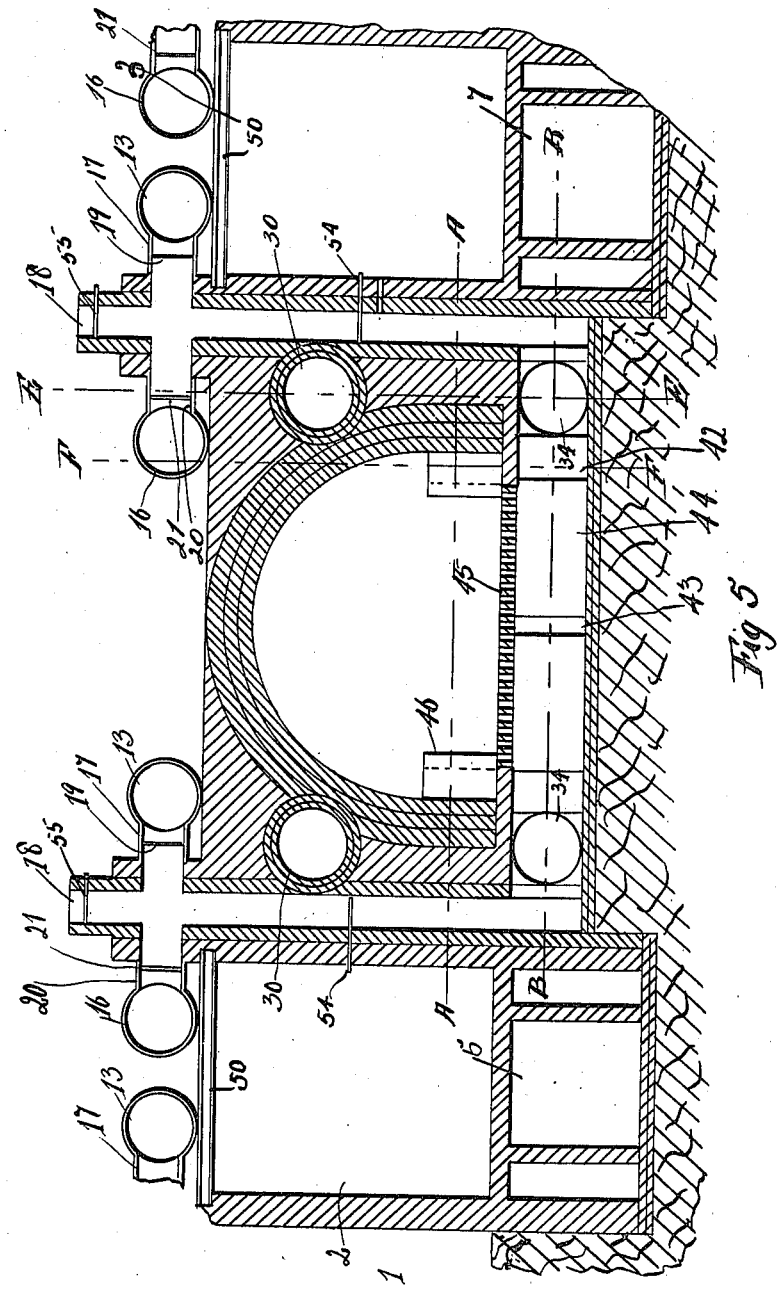

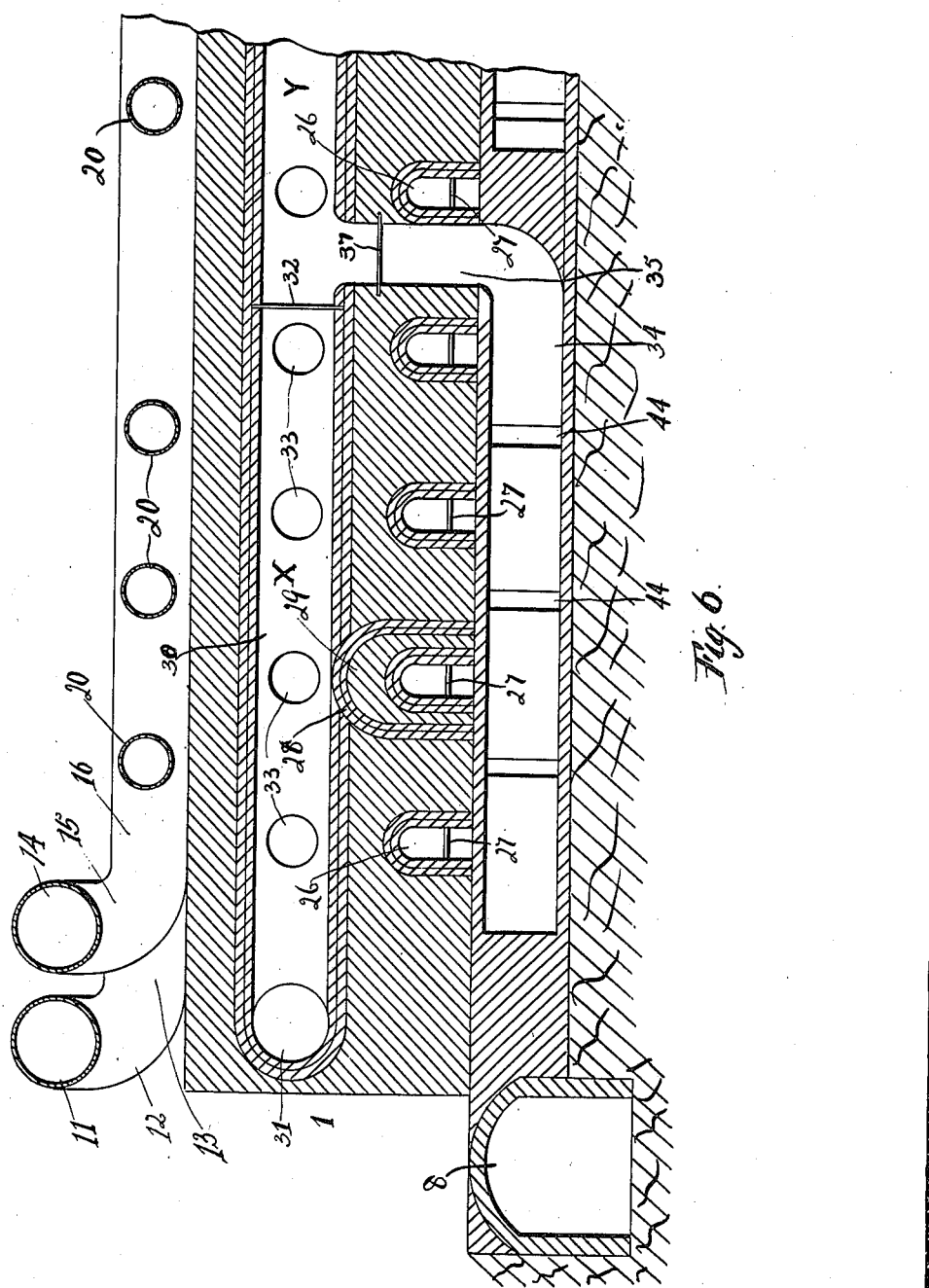

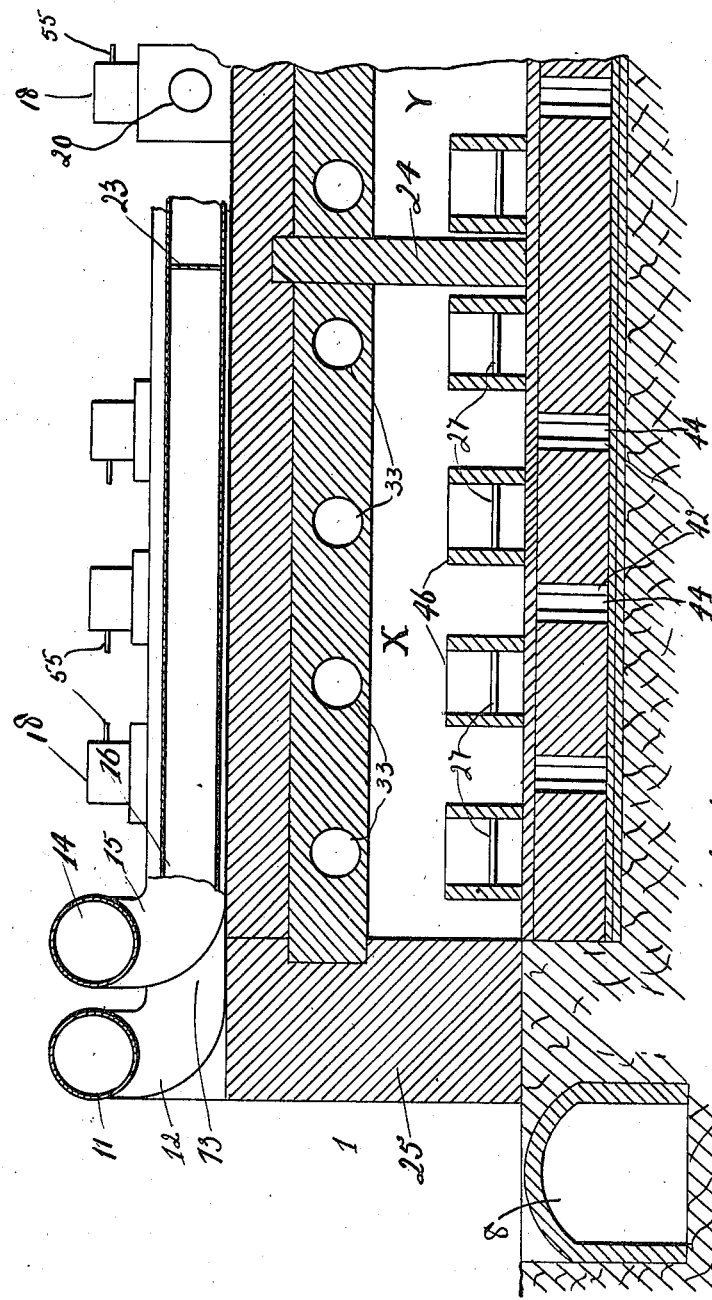

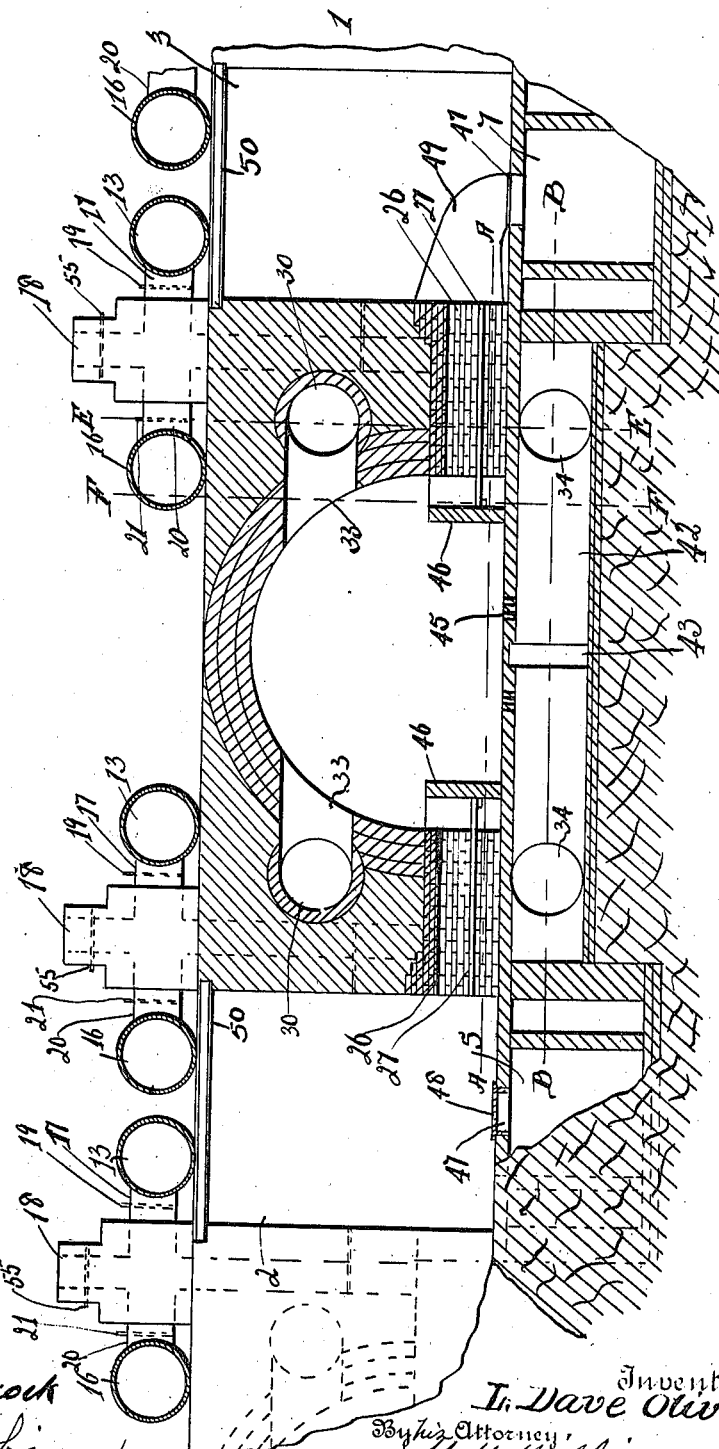

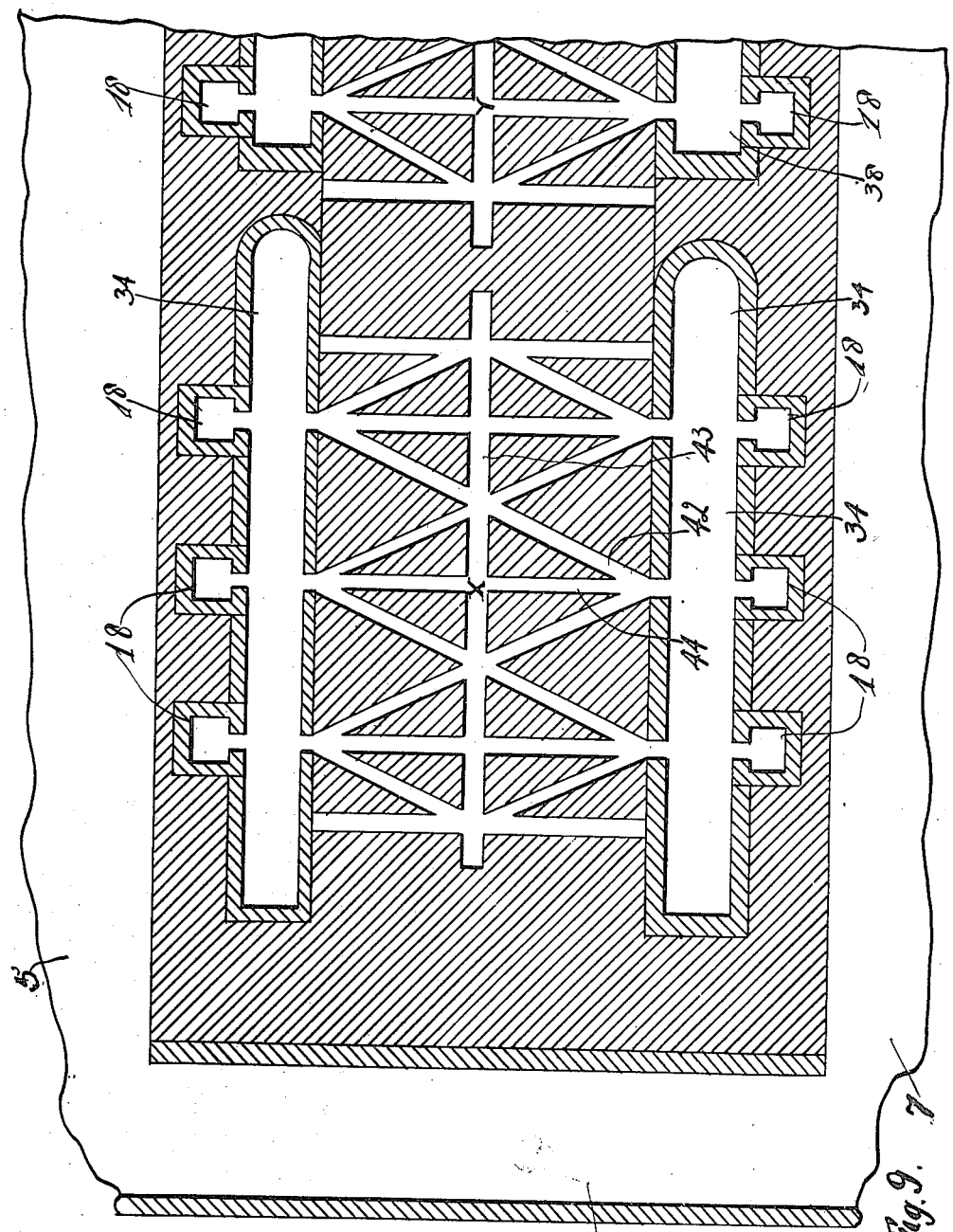

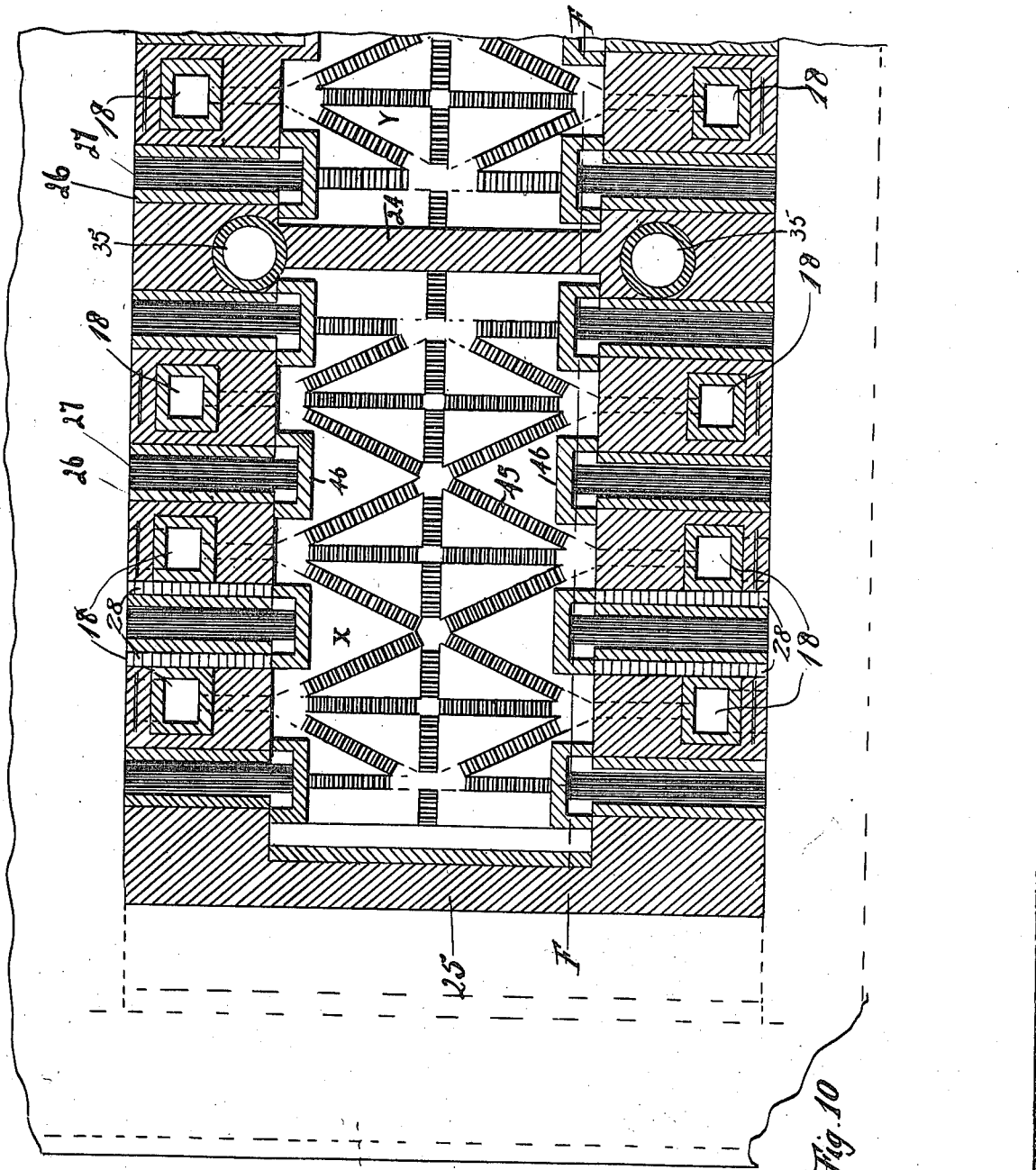

UNITED STATES PATENT OFFICE.

LOTT DAVE OLIVER, OF BLACKWELL, OKLAHOMA, ASSIGNOR OF ONE-HALF TO LLOYD H. THOMPSON, OF BLACKWELL, OKLAHOMA.

BRICK-KILN.

1,144,334.  Specification of Letters Patent.  Patented June 22, 1915.

Application filed August 29, 1913. Serial No. 787,317.

*To all whom it may concern:*

Be it known that I, LOTT DAVE OLIVER, a citizen of the United States, residing at Blackwell, in the county of Kay and State of Oklahoma, have invented new and useful Improvements in Brick-Kilns, of which the following is a specification.

My invention relates to new and useful improvements in combined brick kilns and dryers, and has for its object to eliminate the use of separate dry sheds, and consequently the cost of building, operating and maintaining the same, the products being dried in the kiln proper.

A further object of the invention is to save the labor cost of the setting gang and transfer men, by setting the product in the chambers of the kiln; said product being transferred direct from the machine rooms by means of off-bearing-belts, made to enter the kiln.

A further object of the invention is to save the cost of fuel in drying and burning the product, by means of tunnels and ducts, properly constructed, and operated by suction and circulating fans, governed by suitable dampers, so arranged that all waste heat is conserved from the burning and cooling sections of the kiln, being transferred to the other sections and utilized in drying the green product in its turn.

A still further object of the invention is to save from three to six days in burning the product over the ordinary form of kilns, due to the fact that when the product has been properly dried by waste heat, it being then heated through, is ready for raising the fire to a higher degree of heat.

A still further object of the invention is to make possible the removal of the burnt product from the sections, sooner than in the kilns of ordinary construction, from the fact that the heat is drawn from the cooling section and utilized in other sections.

With these ends in view this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this specification, in which—

Figure 1:
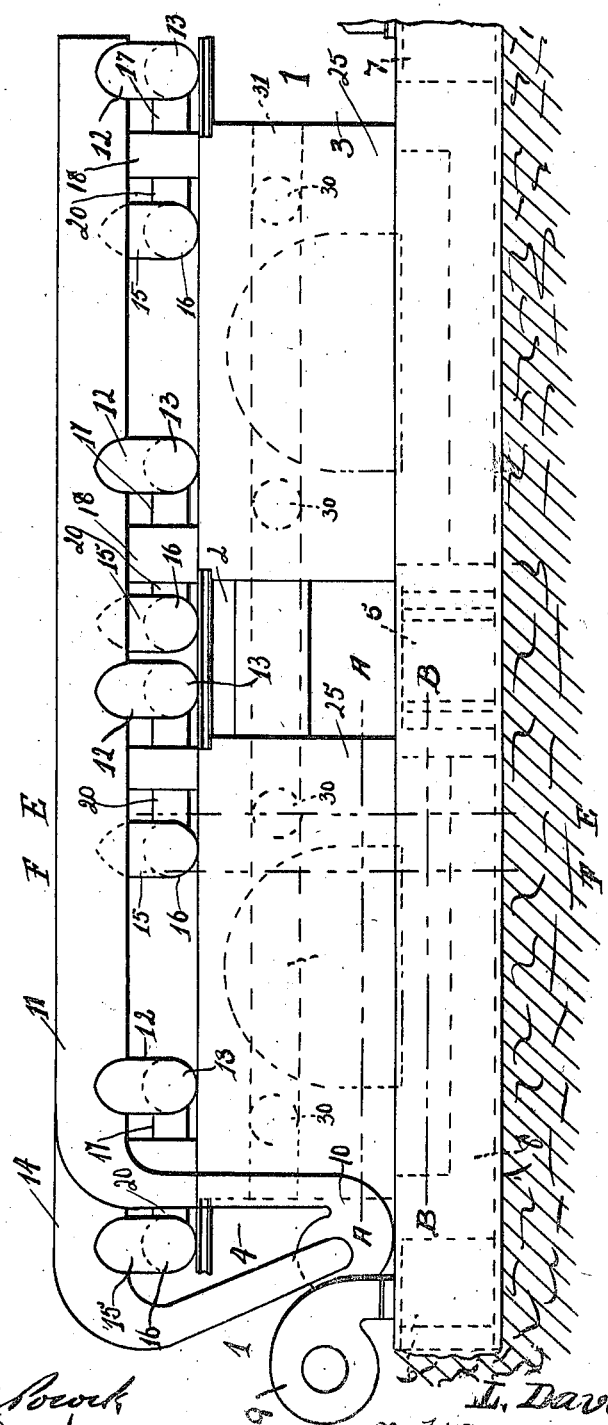
Figure 2:
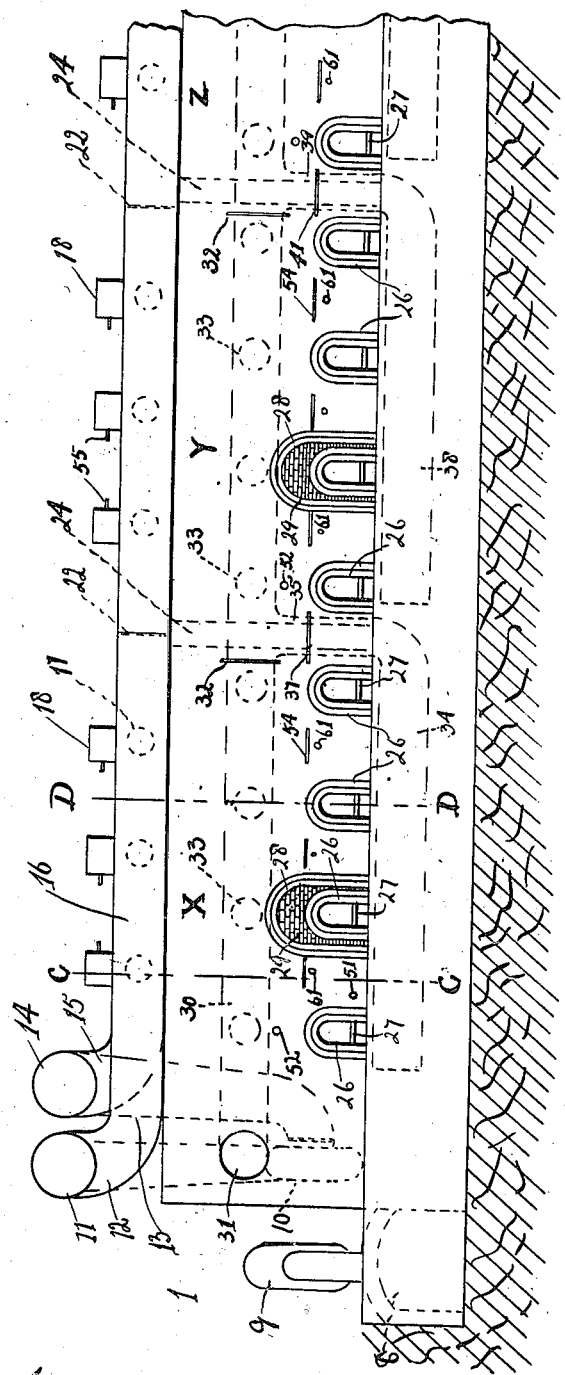

Figure 1, is a front elevation of the apparatus. Fig. 2, is a side elevation. Fig. 3, is a plane view. Fig. 4, is an enlarged side elevation. Fig. 5, is an enlarged section on the line C—C of Fig. 4. Fig. 6, is an enlarged section on the line E—E of Fig. 5. Fig. 7, is an enlarged section of the line F—F of Fig. 5. Fig. 8, is a section on the line D—D of Fig. 4. Fig. 9, is a section on the line B—B of Fig. 5; and Fig. 10, is a section on the line A—A of Fig. 5.

In carrying out my invention as here embodied, 1 represents the kiln proper. In Fig. 1, two of these are shown side by side, having a passage way 2 between them and the passages 3 and 4 on either side. Tunnel ways 5, 6 and 7 extend backward and are connected with a cross-tunnel way 8, to which is attached a suction fan 9. A circulating fan 10 is connected through the main cross pipe 11, having various branches 12, which connect with continuous tubes 13, which extend along the top of the kilns in the same direction as the tunnels 5, 6 and 7. The discharge from the fan 10 is connected with a cross pipe 14 and this in turn by branches 15 with another set of continuous tubes 16 running parallel with the tubes 13. The tubes 13 are connected by branches 17 with the vertical ducts 18, each of these branches being provided with a damper 19 and in like manner the tubes 16 are connected by branches 20 with the vertical ducts 18 and controlled by dampers 21. The tubes 13 have dampers placed at 22, and the tubes 16 dampers placed at 23.

In the side elevation, Fig. 2, two sections of kilns are shown and part of a third being broken off. These are divided by walls 24 and the end wall 25. A number of arches 26 are shown having grate bars or burners 27 permanently set therein, and an arch way 28 also through which the section of the kiln is charged and discharged, the temporary brick wall 29 being put in after each charge, thus forming the entrance to each section of the kilns. The grate bars and bag wall of the charging and discharging archways 28 are to be removed and replaced at every discharge and charge of the kilns as is customary. The kilns are designated as X, Y and Z. Ducts 30 pass from openings 31 the side walls of section X and then pass through all of the sections, and have dampers 32 located adjacent each partition or wall 24, kept closed in regular usage, but opened as hereafter described, to discontinue the regular use of any one section. Said ducts 30 are provided with a plurality of branches 33, a number of which connect with the interior of each section. Under each section are also built ducts, the ones under the section X being designated by the numeral 34, and these ducts pass upward as shown at 35 and connect with those portions of the ducts 30 situated within section Y, and the ducts under section Y are designated by the numeral 38, and said ducts are in the same line with the ducts 34 of section X, and like said ducts 34 rise as at 39 and connect with those portions of the ducts 30 situated within section Z. The risers 35 and 39 are each provided with a baffle plate 37 and 41 respectively, adapted to control the flow of gases.

Fig. 9 is a section under the floor of the section X. The vertical ducts 18 are here connected with horizontal ducts 34, and these in turn connect the passages 42, 43 and 44, forming a net work of passages, and the brick work of the floor of each section is made open as at 45 and known as grill work, so that there shall be a more or less restricted passage way between the interior of the kiln 1 and the passages 44, this being shown more fully in Fig. 10.

Fig. 10 being a section above the floor of the kiln shows the vertical ducts 18 passing through the solid brick work, the arches 26 and the grate bars 27, which end in the bag walls 46, where the heat from the fire is thrown up into the arch of the kiln 1, and this occurs in each of the sections. In the tunnel ways 5, 6 and 7 are openings as at 47 having covers 48, which covers can be removed and portable goose necks 49 substituted as later described. Where the tubes 13 and 16 do not rest upon brick work, they are supported on iron girders as shown at 50. Small circular openings 51 and 52 are provided, in which pyrometers may be placed to determine the heat in various portions of each section of the kiln, and draft gage openings 61 are located in the vertical ducts 18, in which a draft gage may be inserted to determine the draft. Regulating dampers 54 and 55 are placed in the vertical ducts 18 to regulate the circulation and supply of air.

The operation of my device is more fully described as follows:—The section of kiln Z having been loaded with raw material through the arch way 28, the brick work 29 having been replaced and heat having been applied, as will be later shown, until the material is sufficiently dried, fires are then lighted upon the grate bars 27. The product of this heat passing backward against the bag walls 46 is forced upward into the crown of the arch 24, and is drawn downward through the dried brick passing through the openings 45 into the passages 42, 43 and 44, up through the vertical ducts 18 out of the branches 17 into the horizontal tubes 13, the dampers 19 of this section being open and the dampers 21 of this section being closed, so that no air can pass into the continuous tube 16. The dampers 55 are also closed so that no air can enter the tops of the ducts 18. The dampers 22 are open and the dampers 19 are closed from the burning sections to the main cross pipe 11; (but dampers 22 are closed back of sections from which heat is being drawn). The fan 10 draws the hot air and products of combustion from this main cross pipe 11 and delivers it into the cross pipe 14 from which it passes to the continuous tubes 16 and back to the dampers 23 which are closed, the same being at the point in the continuous tubes at the end of the section Y. The dampers 21 in the tubes 20 of section Y are open. All other dampers 21 are closed from cross pipe 14, and the dampers 19 in the branches 17 are closed, and the dampers 55 in the top of the ducts are also closed, so that the hot air passes downward through the vertical ducts 18 into the passage ways 42, 43 and 44 upward through the grille work 45, where it is distributed through another mass of raw brick which is now being dried and heated. The dampers 41 in the risers 39 between Y and Z are closed at this time. These heat products then pass through the passage ways 33 into that portion of the ducts 30 situated in section Y, there being no fire in this section, and the fire boxes or arch ways 26 being temporarily closed, the circulation passes downward from this portion of the ducts 30, dampers 32 being closed, past the baffle plates 37 into the lower ducts 34, which are under section X, then into the passages 42, 43 and 44 through the grilled works 45 and into the product drying in this section, from which it is drawn through the branches 33, into the ducts 30 situated in section X and then through the openings 31, from which it can be drawn to the other sections of the kiln and passed through them with the same object of drying and heating the products as above described. This is continued from section to section until every unit of heat has been taken from the air circulated or until you have passed the air into the last section of the kiln in which the product is placed; when baffle plates corresponding to 37 and 41 in risers corresponding to 35 and 39 are closed just ahead of this section and air is drawn down through the openings in the bag walls 46 through the fire-box openings or arches 26 where the portable goose-necks 49 one of which is shown in Fig. 8, are placed between the openings 47 and the arch ways 26, allowing the suction fan 9 to exhaust the air, which has become cooled and moist from contact with the products, by means of the tunnels 5, 6 and 7 to which the fan 9 is connected by the cross tunnel 8.

It is evident that the regulating damper 55 can be used at any time to inject fresh air, when required, and the damper 54 can be opened or closed to regulate the flow through the various parts of the kiln as required by the readings of the temperature as indicated on the pyrometers which are inserted through the various openings 51 and 52, which are placed at convenient points for indicating the temperature. When you have finished burning the product in a section of the kiln and the fires are extinguished, in order to cool the product in this section for removal, and at the same time conserve the heat, the fire-boxes or archways 26 are opened and air is drawn in through the openings in the bag walls 46 to the crown of kiln and down through the hot brick and through the grilles 45, then through passages 42, 43 and 44 into the vertical ducts 18, out of the branches 17 into the horizontal tubes 13, the dampers 19 of this section being open and the dampers 21 and 55 being closed; where the heat unites with the heat from the burning section and is conducted as previously described. When the product has become cooled, the dampers 22 just ahead of this section are closed. If for any reason desired, the dampers 19, 21, 32 and 41 can be closed and the dampers 54 and 55 opened and each section of the kiln can be burned by natural draft, the same as any down draft kiln. If for any reason it is necessary to cut out one section of the kiln, as for example, for repairs, while the kiln is in operation, the cut-off dampers 32 may be opened and the dampers or baffle-plates corresponding to 37 and 41 in the risers corresponding to 35 and 39 closed, and by temporarily closing openings 33 by building in the same, hot air is drawn past the section which is out of commission, and on to the next section in regular manner; and it would not be necessary to close down the continuous operations of the kiln.

Of couse I do not wish to be limited to the exact details of construction as here shown as these may be varied within the limits of the appended claims without departing from the spirit of my invention.

Having thus fully described my invention, what I claim as new and useful, is—

1. In an apparatus of the character described a series of kiln sections, internal ducts connecting adjacent sections, means for controlling the circulation through said ducts, an external pipe system connected with each of the sections, means for controlling the circulation through said external pipes, means for creating circulation within said pipes, passageways extending adjacent to the sections, goose necks connecting said passageways with said sections, means for exhausting air from said sections, means for supplying said sections with fresh air, and dampers for regulating the flow of the fresh air.

2. In an apparatus of the character described a series of kiln sections arranged adjacent each other, upper and lower ducts passing through all the sections, controlling dampers located within said upper ducts, passageways leading from the upper ducts situated in one section into the lower ducts of the next adjacent section, other passageways under the floors of said sections connected with the lower ducts, grilled floors connecting the interior of the sections with the last named passageways, branches connecting the interior of the sections with the upper ducts, and means for causing circulation through said sections and ducts.

3. In an apparatus of the character described a series of kiln sections arranged adjacent each other, upper and lower ducts passing through all the sections, controlling dampers located within said upper ducts, permanent arches containing grate bars ending in bag walls, passageways leading from the upper ducts situated in one section into the lower ducts of the next adjacent section, other passageways under the floors of said sections connected with the lower ducts, grilled floors connecting the interior of the sections with the passageways, branches connecting the interior of the sections with the upper ducts and means for causing circulation through said sections and ducts.

4. In an apparatus of the character described a series of kiln sections arranged adjacent each other, upper and lower ducts passing through all the sections, controlling dampers located within said upper ducts, permanent arches containing grate bars ending in bag walls, passageways leading from the upper ducts situated in one section into the lower ducts of the next adjacent section, a grilled floor in each section, other passageways connected with the grilled floor and the lower ducts, so that the heat can be evenly drawn through the baked product, and dampers in the first named passageways, for controlling the circulation therethrough.

5. In an apparatus of the character described, a series of kiln sections arranged adjacent each other, upper and lower ducts passing through all the sections, controlling dampers located within the upper ducts, permanent arches containing grate bars ending in bag walls, temporary arches surrounding certain of said permanent arches, passageways leading from the upper ducts situated in one section into the lower ducts of the next adjacent section, a grilled floor in each section, passageways connected with the grilled floor and the lower ducts, so that the heat can be evenly drawn through the baked products, dampers located in the first named passageways, vertical ducts connected with the lower ducts, continuous tubes, and branches containing dampers connecting the vertical ducts with the continuous tubes, said tubes being provided with means for circulating the gases.

6. In an apparatus of the character described, a series of kiln sections arranged adjacent each other, upper and lower ducts passing through all the sections of said kilns, controlling dampers located within said upper ducts, permanent arches, grate bars located in said arches, bag walls in which said grate bars end, passageways leading from the upper ducts situated in one section into the lower ducts of the next adjacent section, a series of vertical ducts for each kiln section, a grilled floor in each kiln section, passageways leading from said vertical ducts to the grilled floor, so that the heat may be evenly drawn through the products being baked, and dampers located within the vertical ducts for controlling the passage of the heat products.

7. In an apparatus of the character described a series of kiln sections arranged adjacent each other, upper and lower horizontal ducts passing through all the kiln sections, controlling dampers located within said upper ducts, permanent arches, grate bars in said arches, bag walls in which said grate bars end, passageways leading from the upper ducts situated in one section into the lower ducts of the next adjacent section, a series of vertical ducts for each kiln section, a grilled floor in each kiln section, passageways leading from said vertical ducts to the grilled floors, so that the heat may be evenly drawn through the products being baked, dampers located within the vertical ducts for controlling the passage of the heat products therethrough, a cross pipe located crosswise of the series of kilns, continuous tubes leading from the vertical ducts to said cross pipe, dampers for controlling the passage of the heat products therethrough, a main cross pipe, other continuous tubes leading from the vertical ducts to said main cross pipe, and means for exhausting the heat products from said main cross pipe as specified.

8. In an apparatus of the character described a series of kiln sections arranged adjacent each other, upper and lower ducts passing through all the kiln sections, controlling dampers located within said upper ducts, permanent arches, grate bars in said arches, bag walls in which said grate bars end, passageways leading from the upper ducts situated in one section into the lower ducts of the next adjacent section, a series of vertical ducts for each kiln section, a grilled floor in each kiln section, passageways leading from said vertical ducts to the grilled floors, so that the heat may be evenly drawn through the products being baked, dampers located within the vertical ducts for controlling the passage of the heat products therethrough, a main cross pipe, continuous tubes leading from the vertical ducts to said main cross pipe, means for exhausting the heat products from said main cross pipe, a second cross pipe, a second set of continuous tubes connected with the last named cross pipe, branch pipes leading from the last named tubes into said vertical ducts, dampers in said cross pipes for controlling the passage of the heat products and means for drawing the heat products through the last named cross pipe as specified.

9. In an apparatus of the character described, a series of kiln sections arranged adjacent each other, upper and lower horizontal ducts passing through all the kiln sections, controlling dampers located within said upper ducts, permanent arches, grate bars in said arches, bag walls in which said grate bars end, passageways leading from the upper ducts situated in one section into the lower ducts of the next adjacent section, a series of vertical ducts for each kiln section, a grilled floor in each kiln section, passageways leading from said vertical ducts to the grilled floors, so that the heat may be evenly drawn through the products being baked, dampers located within the vertical ducts for controlling the passage of the heat products therethrough, a main cross pipe, continuous tubes leading from the vertical ducts to said main cross pipe, means for exhausting the heat products from said main cross pipe, a second cross pipe, branch pipes leading from the last named tubes into said vertical ducts, means for controlling the passage of the heat products through the last named cross pipe, and a series of dampers for controlling the passage of the heat products in such manner that the same may be drawn from one section and delivered to another section, either in an upward or downward course.

10. In an apparatus of the character described, a series of kiln sections arranged adjacent each other, upper and lower horizontal ducts passing through all the kiln sections, controlling dampers located within said upper ducts, permanent arches, grate bars in said arches, bag walls in which said grate bars end, passageways leading from the upper ducts situated in one section into the lower ducts of the next adjacent section, a series of vertical ducts for each kiln section, a grilled floor in each of the kiln sections, passageways leading from said vertical ducts to the grilled floors, so that the heat may be evenly drawn through the products being baked, dampers located within the vertical ducts for controlling the passage of the heat products therethrough, a main cross pipe, continuous tubes leading from the vertical ducts to said main cross pipe, means for exhausting the heat products from said main cross pipe, a second cross pipe a second set of continuous tubes connected with the last named cross pipe, branch pipes leading from the last named tubes into said vertical ducts, means for controlling the passage of the heat products through the last named cross pipe, a series of dampers for controlling the passage of the heat products in such manner that the same may be drawn from one section and delivered to another section either in an upward or downward course, a series of tunnel-ways running parallel with the kilns, a tunnel connecting the series of the tunnel-ways, portable goose necks for connecting certain of the arches at certain times with the tunnel-ways, dampers in the tops of the vertical ducts for regulating the inflow of fresh air to said ducts from whence it will be drawn through the arches that are connected by the goose necks with the tunnel-ways, and means for drawing the air downward through the vertical ducts for cooling the baked products in certain of the kilns at desirable times.

11. In an apparatus of the character stated a series of kilns arranged adjacent each other, fire places for said kilns, upper and lower horizontal ducts passing through said kilns, and connected with the kiln chambers, passageways connecting the upper ducts of one section with the lower horizontal ducts situated in the next adjacent section, a series of vertical ducts for each section of each kiln, passageways connecting said vertical ducts with the floors of the kilns, a pair of cross pipes, a plurality of continuous tubes connected by the cross pipes, and connecting the vertical ducts with said cross pipes, means for drawing the heat products from one of said cross pipes and delivering it to the other cross pipe, and means for controlling the circulation through the different pipes and ducts.

In testimony whereof, I have hereunto affixed my signature in the presence of two subscribing witnesses.

L. DAVE OLIVER.

Witnesses:
   L. H. THOMPSON,
   ERNEST WHEELER.